(12) United States Patent
Baik et al.

(10) Patent No.: US 8,730,307 B2
(45) Date of Patent: May 20, 2014

(54) LOCAL MULTI-VIEW IMAGE DISPLAY APPARATUS AND METHOD

(75) Inventors: Aron Baik, Yongin-si (KR); Yong Ju Jung, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 12/659,725

(22) Filed: Mar. 18, 2010

(65) Prior Publication Data

US 2010/0315492 A1    Dec. 16, 2010

(30) Foreign Application Priority Data

Jun. 16, 2009    (KR) .................. 10-2009-0053417

(51) Int. Cl.
*H04N 13/04* (2006.01)
*H04N 15/00* (2006.01)

(52) U.S. Cl.
USPC ............ 348/51; 348/148; 348/169; 348/308; 345/9; 345/32; 345/156; 707/E17.121; 359/462

(58) Field of Classification Search
USPC .......... 348/51, 148, 308, 169; 345/9, 156, 32; 707/E17.121
See application file for complete search history.

(56) References Cited

U.S. PATENT DOCUMENTS

| | | | |
|---|---|---|---|
| 6,985,290 B2 * | 1/2006 | Putilin et al. .................. | 359/462 |
| 2007/0057911 A1 * | 3/2007 | Fateh ............................ | 345/156 |
| 2009/0278936 A1 * | 11/2009 | Pastoor et al. ................ | 348/169 |
| 2010/0002079 A1 * | 1/2010 | Krijn et al. .................... | 348/148 |

FOREIGN PATENT DOCUMENTS

| | | |
|---|---|---|
| KR | 10-2006-0106451 | 10/2006 |
| KR | 10-2008-0004407 | 1/2008 |
| WO | 10-2006-0066576 | 6/2006 |
| WO | 10-2006-0105140 | 10/2006 |

* cited by examiner

*Primary Examiner* — Kyung H Shin
(74) *Attorney, Agent, or Firm* — Staas & Halsey LLP (57) ABSTRACT

A local multi-view image display apparatus and method is provided. The local multi-view image display method may track a location of an observer, and locally display a multi-view input image on the tracked location.

14 Claims, 6 Drawing Sheets

LOCAL MULTI-VIEW IMAGE DISPLAY APPARATUS AND METHOD

CROSS-REFERENCE TO RELATED APPLICATIONS

This application claims the benefit of Korean Patent Application No. 10-2009-0053417, filed on Jun. 16, 2009, in the Korean Intellectual Property Office, the disclosure of which is incorporated herein by reference.

BACKGROUND

1. Field

Example embodiments relate to a local multi-view image display apparatus and method.

2. Description of the Related Art

A multi-view image, a stereoscopic image, and the like may be generated by geometrically transforming and spatially processing photographed images using at least two cameras.

A multi-view image, and the like may relate to a three-dimensional (3D) image processing technology providing a viewer with a variety of view images. A stereoscopic 3D image may be provided by obtaining identical 3D images using at least two cameras.

Currently, much research on a super multi-view (SMV) image, a free viewpoint television (FTV), as well as a multi-view image has been actively conducted.

Also, a multi-view image may be generated via rendering using a predetermined input image such as a monocular image, and a depth map of the input image.

Figure 1:
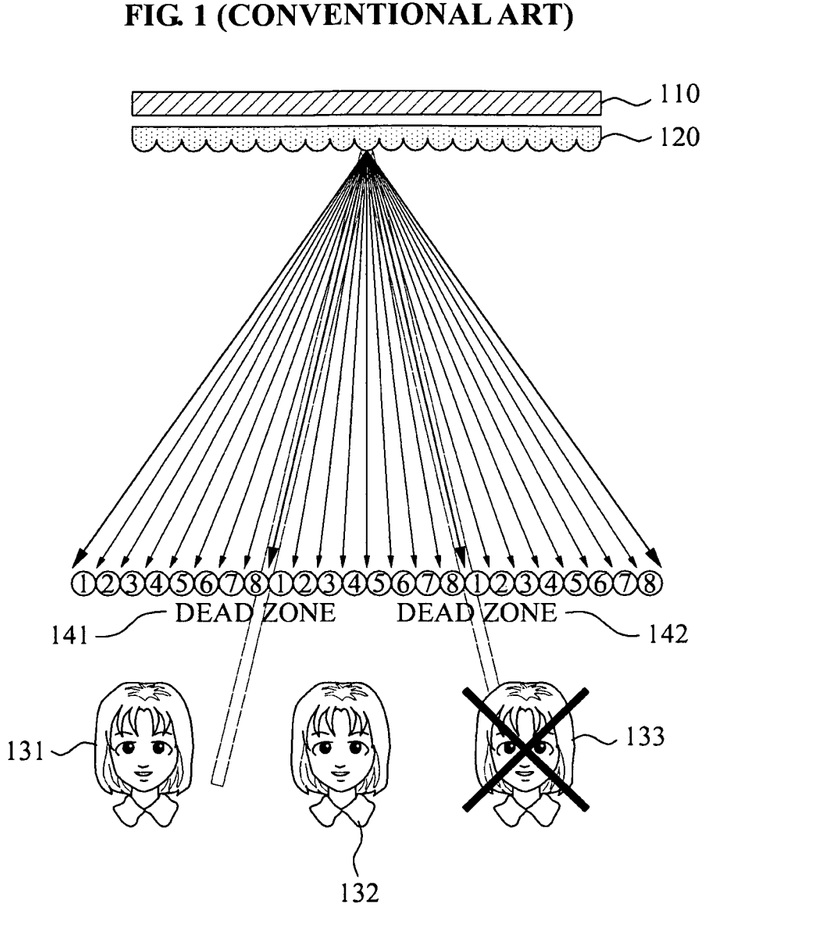
FIG. 1 conceptually illustrates a multi-view image display apparatus according to a conventional art.

FIG. 1 conceptually illustrates a multi-view image display apparatus according to a conventional art. In general, the multi-view image display apparatus may generate a plurality of views using a panel 110 and a lenticular sheet (or parallax barrier) 120, as illustrated in FIG. 1. Since the multi-view image display apparatus may output an image in the plurality of views, an observer may view the image outputted by the multi-view image display apparatus in a variety of locations. In the multi-view image display apparatus, the plurality of views may be repeated at predetermined intervals due to an optical property of the lenticular sheet 120.

FIG. 1 illustrates an example of the multi-view image display apparatus where eight views are repeated. Specifically, in the example of FIG. 1, the eight views from view 1 to view 8 are repeated.

As illustrated in FIG. 1, when views are repeated at predetermined intervals, an observer, located on a border where a subsequent repetition begins, may not view an accurate output image.

For example, it may be assumed that the multi-view image display apparatus outputting a three-dimensional (3D) image may output a right-inclined image on view 1 through view 8 in an order from the view 1 to the view 8.

That is, it may be assumed that, when an observer is located at view 2 and view 3, the observer may view a left image through view 2, view a right image through view 3, and thereby may view the 3D image. Also, it may be assumed that, when the observer is located at view 3 and view 4, the observer may view a left image through view 3, view a right image through view 4, and thereby may view the 3D image.

In this instance, since an observer (1) 131 is located on view 1 through view 8 generated by the panel 110 and the lenticular lens 120, the observer (1) 131 may view the 3D image outputted by the multi-view image display apparatus.

Also, since an observer (2) 132 is located on view 1 through view 8 generated by the panel 110 and the lenticular lens 120, the observer (2) 132 may view the 3D image outputted by the multi-view image display apparatus.

However, since an observer (3) 133 is located between view 8 and the subsequent view 1, the observer (3) 133 may not appropriately view the 3D image. Specifically, a left image is to be outputted in the view 8 and a right image is to be outputted in the view 1 so that the observer (3) 133 may view the appropriate 3D image.

However, since it is assumed that the multi-view image display apparatus outputs the right-directional image in the order from view 1 to view 8, the right image may be outputted in view 8 and the left image may be outputted in view 1.

Accordingly, the observer (3) 133 may not view the accurate 3D image.

That is, an observer in dead zones 141 and 142 between view 8 and the subsequent view 1 may not view the 3D image.

As described above, the general multi-view image display apparatus may generate the dead zones 141 and 142 where an observer may not view an accurate output image. Accordingly, a multi-view image display apparatus where a number of displayable views increases has been recently provided to prevent a dead zone.

Hereinafter, a multi-view image display apparatus where a number of displayable views increases in comparison with the general multi-view image display apparatus may be referred to as a 'wide multi-view image display apparatus'.

Figure 2:
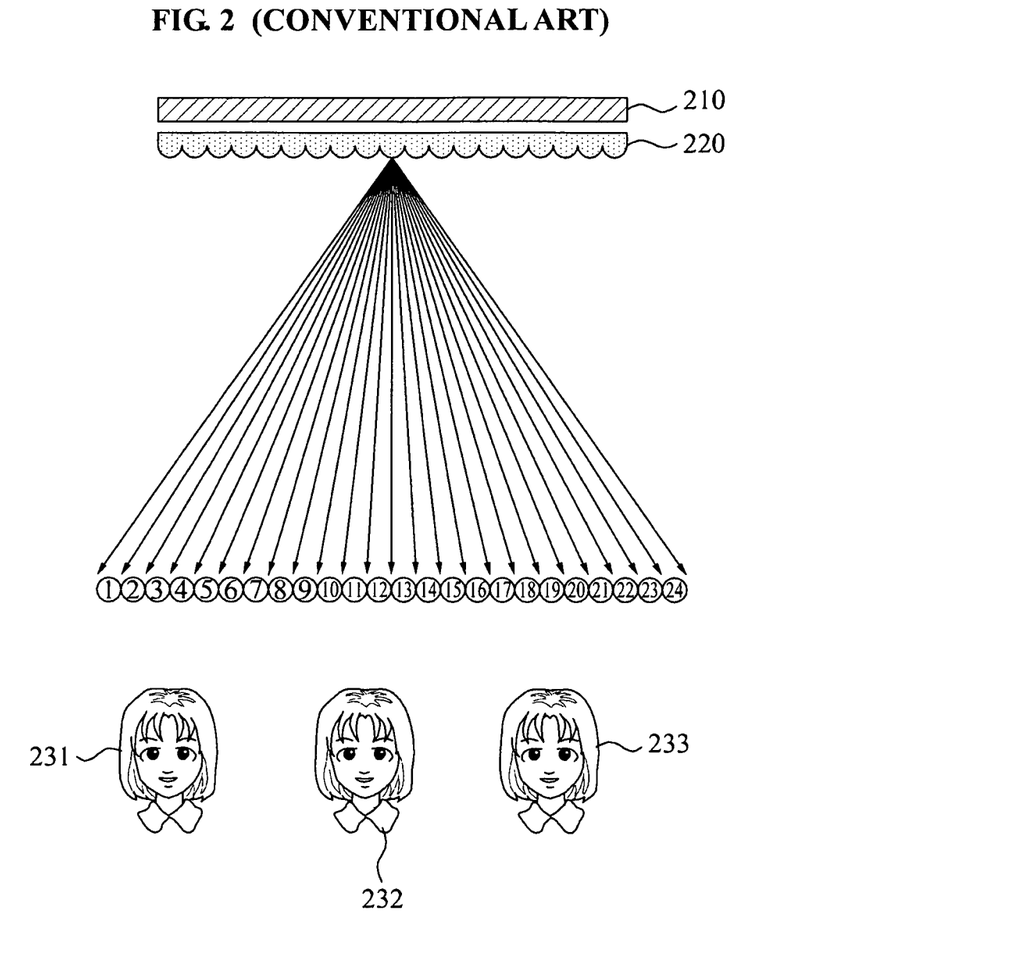
FIG. 2 conceptually illustrates a wide multi-view image display apparatus according to the conventional art.

FIG. 2 conceptually illustrates a wide multi-view image display apparatus in a conventional art.

The wide multi-view image display apparatus may generate a plurality of views using a panel 210 and a lenticular sheet 220 like the multi-view image display apparatus in the conventional art of FIG. 1.

A number of displayable views of the wide multi-view image display apparatus may be greater than that of the multi-view image display apparatus of FIG. 1.

FIG. 2 illustrates an example where the wide multi-view image display apparatus generates 24 views.

Since the wide multi-view image display apparatus may generate 24 views, an observer may view an appropriate output image wherever the observer is located within the 24 views.

For example, when the wide multi-view image display apparatus outputs a 3D image through the 24 views, an observer (1) 231 may view the 3D image through view 3 and view 4, and an observer (2) 232 may view the 3D image through view 11 and view 12. Also, an observer (3) 233 may view the 3D image through view 18 and view 19.

However, since the wide multi-view image display apparatus horizontally displays a plurality of views, a same image may not be provided to observers in different locations.

For example, when the wide multi-view image display apparatus displays a vehicle through view 1 through view 24, the observer (1) 231 may view only the left side of the vehicle, the observer (2) 232 may view only the middle of the vehicle, and the observer (3) 233 may view only the right side of the vehicle.

That is, the wide multi-view image display apparatus may output the plurality of view images in a widthwise direction, unlike the multi-view image display apparatus.

Accordingly, the wide multi-view image display apparatus may not be used when a same image is to be provided to observers regardless of an observer's location, for example, a movie theater.

Also, a greater number of multi-view cameras is required in comparison with the general multi-view image display apparatus to produce image contents that may be used in the wide multi-view image display apparatus. Also, since a size of image contents in a wide multi-view image of the wide multi-view image display apparatus is greater than a size of general image contents, a large bandwidth is required.

The multi-view image display apparatus and the wide multi-view image display apparatus have been described. The multi-view image display apparatus may generate a dead zone where an observer may not view an accurate output image since views are repeated at predetermined intervals, and while the wide multi-view image display apparatus does not generate the dead zone, the wide multi-view image display apparatus may not provide a same image to observers in different locations.

SUMMARY

Accordingly, it is an aspect of the present invention to provide a multi-view image display apparatus that may provide a same image regardless of an observer's location without a dead zone.

Accordingly, it is an aspect of the present invention to provide an improved multi-view image technology.

Additional aspects and/or advantages will be set forth in part in the description which follows and, in part, will be apparent from the description, or may be learned by practice of the invention.

The foregoing and/or other aspects may be achieved by providing a local multi-view image display apparatus, including: a location tracking unit to track a location of an observer; and a display unit to locally display a multi-view input image of the tracked location based on a tracking result of the location tracking unit.

The foregoing and/or other aspects may be achieved by providing a local multi-view image display method of a local multi-view image display apparatus, the local multi-view image display method including: tracking a location of an observer using a location tracking unit; and locally displaying a multi-view input image on the tracked location based on a tracking result of the location tracking unit.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION OF EMBODIMENTS

Hereinafter, the local multi-view image display apparatus and method is described in detail with reference to FIG. 3 through FIG. 6.

Figure 3:
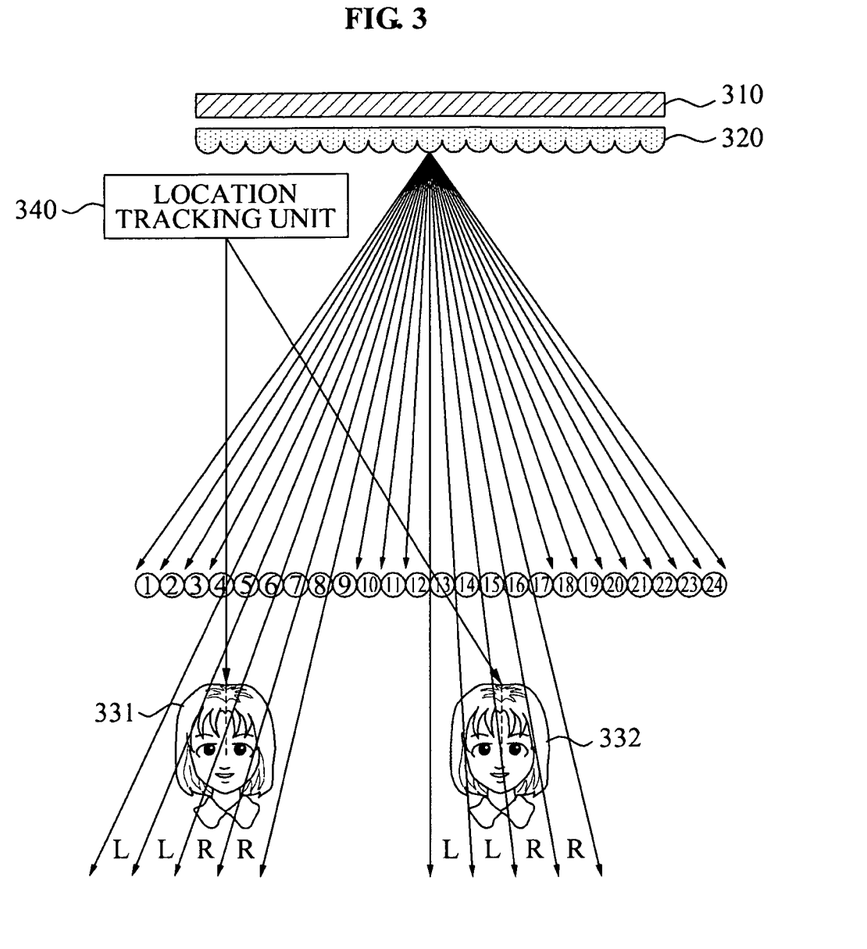
FIG. 3 conceptually illustrates a local multi-view image display apparatus according to example embodiments of the present invention.

FIG. 3 conceptually illustrates a local multi-view image display apparatus according to example embodiments.

The local multi-view image display apparatus may generate a plurality of views using a panel 310 and a lenticular sheet 320 which form a wide multi-view image display apparatus.

Also, the local multi-view image display apparatus may include a location tracking unit 340 that may track each eye of each observer.

The location tracking unit 340 may track eyes of observers (1 and 2) 331 and 332 in real time and identify a location of each of the eyes.

When the location tracking is completed, the local multi-view image display apparatus may display a left image and a right image through views, corresponding to the location of the eyes of each of the observers (1 and 2) 331 and 332, from among the generated plurality of views based on a tracking result of the location tracking unit 340.

For example, as illustrated in FIG. 3, it may be assumed that a left eye of the observer (1) 331 is located on view 6 of 24 views, and a right eye of the observer (1) 331 is located on view 7 of the 24 views.

In this instance, when the location of each of the left eye and the right eye is tracked by the location tracking unit 340, the local multi-view image display apparatus may display a left image through view 6 and a right image through view 7, based on the tracking result.

Through this, the observer (1) 331 may view an accurate 3D image.

Also, a left eye of the observer (2) 332 is located on view 14 and a right eye of the observer (2) 332 is located on view 15. Accordingly, the local multi-view image display apparatus may display a left image through view 14 and a right image through view 15, based on the tracking result of the location tracking unit 340.

Through this, the observer (2) 332 may view an accurate 3D image.

Accordingly, the local multi-view image display apparatus may track the locations of the eyes of the observers (1 and 2) 331 and 332 using the location tracking unit 340, and display the left image and the right image through the views corresponding to the locations of the eyes of the observers (1 and 2) 331 and 332. Thus, a dead zone associated with the locations of the observers (1 and 2) 331 and 332 may be prevented, and a same image may be provided to the observers (1 and 2) 331 and 332 regardless of the locations of the observers (1 and 2) 331 and 332.

According to example embodiments, however, location tracking is to be accurate in that locations of eyes of an observer are to be tracked in real time. When a slight error occurs, an accurate image may not be provided to the observer.

Accordingly, although the observer may move, the observer may feel as if the 3D image accompanies the observer.

Also, according to other example embodiments, since a multi-view image may not be practically provided to the observer, an automatic depth scaling, occurring when a multi-view image is provided, may not be performed.

Thus, according to other example embodiments, a local multi-view image display apparatus may track a location of a head of an observer, and locally display a multi-view image on the tracked location. Accordingly, a dead zone may be prevented, a same image may be provided regardless of a location of the observer, an error of location tracking may be reduced, a motion parallax may be reflected, and an automatic depth scaling may be performed.

Hereinafter, the local multi-view image display apparatus according to other example embodiments is described in detail with reference to FIG. 4.

Figure 4:
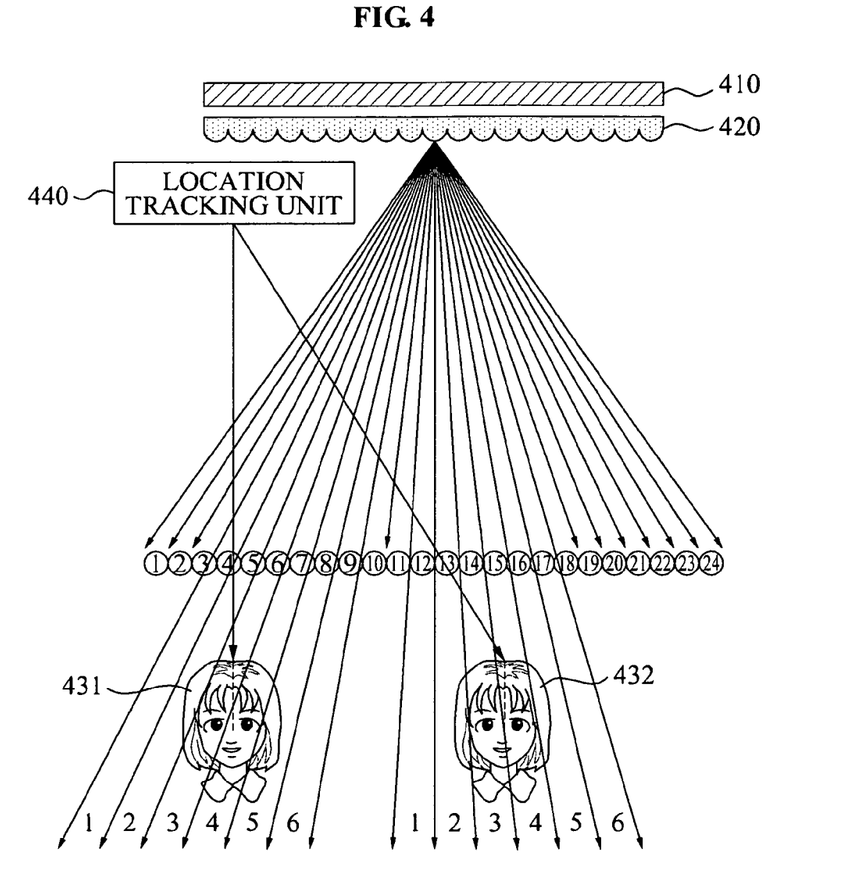
FIG. 4 conceptually illustrates a local multi-view image display apparatus according to other example embodiments of the present invention.

FIG. 4 conceptually illustrates a local multi-view image display apparatus according to other example embodiments.

The local multi-view image display apparatus may generate a plurality of views using a panel 410 and a lenticular sheet 420.

Also, the local multi-view image display apparatus may include a location tracking unit 440 that may track a head of an observer.

The location tracking unit 440 may track heads of observers (1 and 2) 431 and 432 in real time and identify a location of each of the heads.

Since the location tracking unit 440 may track the heads of the observers (1 and 2) 431 and 432, an error of location tracking may be reduced compared to when locations of eyes of the observers (1 and 2) 431 and 432 are tracked.

When the location tracking is completed, the local multi-view image display apparatus may match at least one view of a multi-view input image with at least one view corresponding to the tracked locations of the heads from among the plurality of views, generated by the local multi-view image display apparatus, based on a result of the location tracking.

Also, the local multi-view image display apparatus may display the multi-view input image through the at least one view corresponding to the tracked locations of the heads of the observers (1 and 2) 431 and 432.

It may be assumed that the local multi-view image display apparatus outputs a multi-view input image with six views.

A head of the observer (1) 431 is located on view 4 through view 9 from among 24 views. Accordingly, when a location of the head of the observer (1) 431 is tracked by the location tracking unit 440, the focal multi-view image display apparatus may match the six views including view 4 through view 9 with six views of the multi-view input image, based on the location tracking result.

Specifically, view 4 may be matched with view 1 of the multi-view input image, view 5 may be matched with view 2 of the multi-view input image, view 6 may be matched with view 3 of the multi-view input image, view 7 may be matched with view 4 of the multi-view input image, view 8 may be matched with view 5 of the multi-view input image, and view 9 may be matched with view 6 of the multi-view input image.

Also, the local multi-view image display apparatus may display the multi-view input image through view 4 through view 9.

Through this, the observer (1) 431 may view the multi-view input image with the six views.

Also, a head of the observer (2) 432 is located on view 12 through view 17 from among the 24 views. Accordingly, when a location of the head of the observer (2) 432 is tracked by the location tracking unit 440, the local multi-view image display apparatus may match the six views including view 12 through view 17 with the six views of the multi-view input image.

Specifically, view 12 may be matched with view 1 of the multi-view input image, view 13 may be matched with view 2 of the multi-view input image, view 14 may be matched with view 3 of the multi-view input image, view 15 may be matched with view 4 of the multi-view input image, view 16 may be matched with view 5 of the multi-view input image, and view 17 may be matched with view 6 of the multi-view input image.

Also, the local multi-view image display apparatus may display the multi-view input image of the view 12 through the view 17.

Through this, the observer (2) 432 may view the multi-view input image with the six views.

Accordingly, the local multi-view image display apparatus may track the location of the head of each of the observers (1 and 2) 431 and 432, and locally display the multi-view image on the tracked location. Accordingly, a dead zone may be prevented, a same image may be provided regardless of the locations of the observers (1 and 2) 431 and 432.

In this instance, a number of views generated by the local multi-view image display apparatus is to be greater than a number of views of the multi-view input image.

According to other example embodiments, the location tracking unit 440 may measure a motion variation of the head of each of the observers (1 and 2) 431 and 432. Also, when the measured motion variation is greater than a predetermined threshold value, the location tracking unit 440 may determine that the location of the head of each of the observers (1 and 2) 431 and 432 changes.

For example, when the threshold value is a motion variation when each of the observers (1 and 2) 431 and 432 moves as much as five views, and the observer (1) 431 moves from the location, corresponding to view 4 through view 9, to a location corresponding to the view 6 through the view 11, the location tracking unit 440 may determine that the observer 431 does not move.

Accordingly, the local multi-view image display apparatus may continue displaying the multi-view input image from view 4 through view 9.

In this instance, although the observer (1) 431 moves the location corresponding to view 4 through view 9, to the location corresponding to view 6 through view 11, the observer (1) 431 may appropriately view the multi-view input image displayed from view 4 through view 9, since the local multi-view image display apparatus may display the multi-view input image from view 4 through view 9.

That is, the observer (1) 431 may view the multi-view input image through views different from the six views from view 4 to view 9.

However, when the observer (1) 431 moves from the location, corresponding to views 4 through 9, to a location corresponding to views 10 through 15, the location tracking unit 440 may determine that the observer 431 moves, and track the location of the head of the observer (1) 431.

Accordingly, the local multi-view image display apparatus may display the multi-view input image from view 10 through view 15.

That is, when the observer (1) 431 moves from the location, corresponding to views 4 through 9, to the location corresponding to views 10 through view 15, the observer (1) 431 may not view the multi-view input image displayed from views 4 through 9. Accordingly, the local multi-view image display apparatus may display the multi-view input image from views 10 through 15 where the observer (1) 431 moves.

As described above, when a motion variation with respect to the head of each of the observers (1 and 2) 431 and 432 is slight, the local multi-view image display apparatus may disregard the movement, and display the multi-view input image where a motion parallax is reflected.

When the local multi-view image display apparatus tracks a changed location, and newly displays the multi-view input image, every time the location of the head of each of the observers (1 and 2) 431 and 432 changes, the observers (1 and 2) 431 and 432 may not feel tired, as described above with reference to FIG. 3.

Thus, according to other example embodiments, the local multi-view image display apparatus may track the location of the head of each of the observers (1 and 2) 431 and 432, and locally display the multi-view image. Accordingly, a close tracking of the location of the head of each of the observers (1 and 2) 431 and 432 may not be required. Also, the dead zone may be prevented, a same image which is a multi-view input image may be provided to the observers (1 and 2) 431 and 432, and thus a motion parallax may be reflected, the observers (1 and 2) 431 and 432 may feel less tired, and an automatic depth scaling may be performed.

Figure 5:
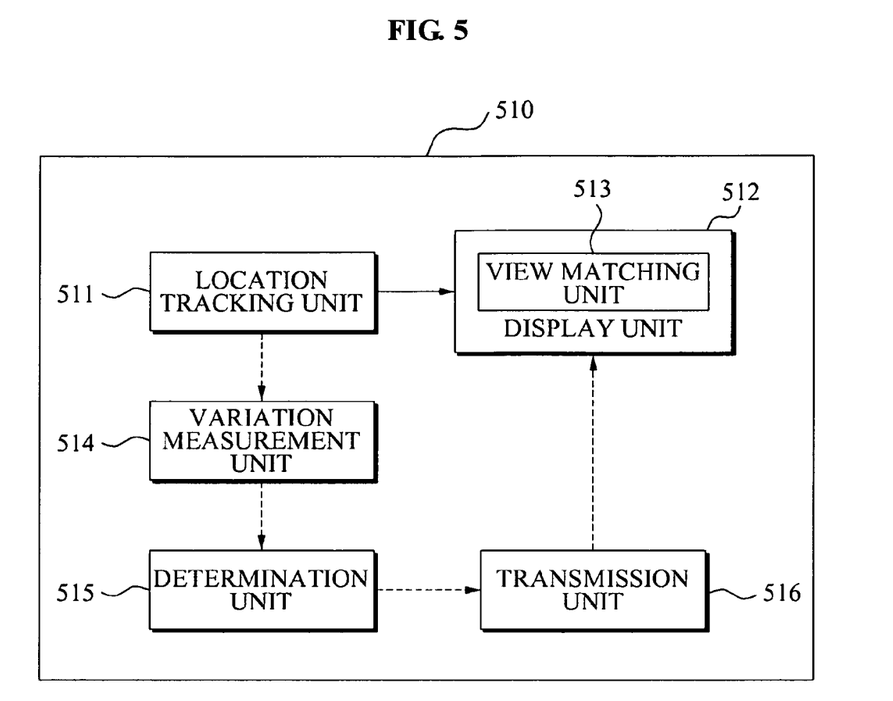
FIG. 5 illustrates a configuration of a local multi-view image display apparatus according to example embodiments of the present invention.

FIG. 5 illustrates a configuration of a local multi-view image display apparatus 510 according to example embodiments.

The local multi-view image display apparatus 510 is illustrated in FIG. 5. The local multi-view image display apparatus 510 may include a location tracking unit 511 and a display unit 512. The location tracking unit 511 may track a location of an observer. In this instance, the location tracking unit 511 may identify a head of the observer and track a location of the head. Also, the location tracking unit 511 may track the location of the head in real time.

The display unit 512 may locally display the multi-view input image on the tracked location of the head based on a tracking result of the location tracking unit 511. In this instance, the display unit 512 may display the multi-view input image on the tracked location of the head. In this instance, a number of views that may be displayed by the local multi-view image display apparatus 510 may be greater than a number of at least one view of the multi-view input image. According to example embodiments, the display unit 512 may include a view matching unit 513.

The view matching unit 513 may match at least one view of the multi-view input image with at least one view corresponding to the tracked location of the head from among a plurality of views that may be displayed by the local multi-view image display apparatus.

In this instance, the display unit 512 may display the multi-view input image through the at least one view corresponding to the tracked location of the head.

According to example embodiments, the local multi-view image display apparatus 510 may further include a variation measurement unit 514, a determination unit 515, and a transmission unit 516.

The variation measurement unit 514 may measure a motion variation of the head based on the tracking result of the location tracking unit 511, when the location of the head changes.

The determination unit 515 may compare the measured motion variation with a threshold value, and determine whether the measured motion variation is greater than the threshold value.

The transmission unit 516 may transmit a tracking result of the changed location of the head to the display unit 512, when the measured motion variation is greater than the threshold value. Here, the changed location of the head may be tracked by the location tracking unit 511.

In this instance, the display unit 512 may display the multi-view input image on the changed location of the head, when the tracking result of the changed location of the head is received from the transmission unit 516.

The configuration of the local multi-view image display apparatus 510 has been described with reference to FIG. 5. Further detailed descriptions will be omitted herein, since an operation of the local multi-view image display apparatus 510 has been described above with reference to FIG. 3 and FIG. 4.

Figure 6:
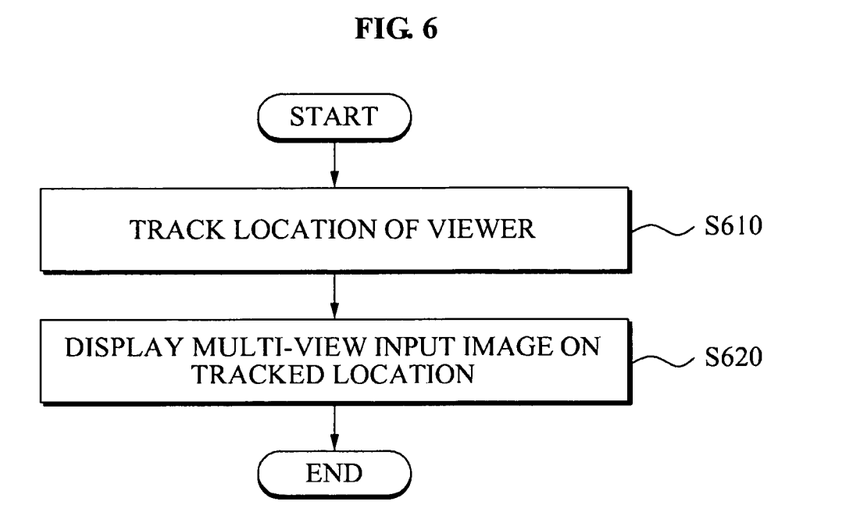
FIG. 6 illustrates a flowchart of a local multi-view image display method according to example embodiments of the present invention.

FIG. 6 illustrates a flowchart of a local multi-view image display method according to example embodiments.

In operation S610, a location of an observer may be tracked by a location tracking unit.

In this instance, in operation S610, a head of the observer may be identified, and a location of the head may be tracked.

In operation S620, a multi-view input image may be displayed on the tracked location based on a tracking result of the location tracking unit.

In this instance, in operation S620, the multi-view input image may be displayed on the tracked location of the head.

According to example embodiments, in operation S620, an operation of matching at least one view of the multi-view input image with at least one view corresponding to the tracked location of the head from among a plurality of views that may be displayed by the local multi-view image display apparatus may be included.

Also, in operation S620, an operation of displaying the multi-view input image through the at least one view corresponding to the tracked location of the head may be further included.

According to example embodiments, when the location of the head changes, an operation of measuring a motion variation of the head based on the tracking result of the location tracking unit may be further included after operation S610.

Also, an operation of comparing the measured motion variation with a threshold value and determining whether the measured motion variation is greater than the threshold value may be further included.

In this instance, in operation S620, when the measured motion variation is greater than the threshold, the multi-view input image may be displayed on the changed location of the head based on a tracking result of the changed location of the head. The changed location of the head may be tracked by the location tracking unit.

The local multi-view image display method has been described with reference to FIG. 6. Further detailed descriptions will be omitted herein, since the local multi-view image display method may correspond to a configuration of the local multi-view image display apparatus described above with reference to FIG. 3 through FIG. 5.

According to example embodiments, the local multi-view image display method and apparatus may track a location of an observer, locally display a multi-view input image on the tracked location, and thereby may prevent a dead zone from occurring and provide a same image regardless of a location of the observer.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A local multi-view image display apparatus, comprising:
   a location tracking unit to track a location of an observer;
   a variation measurement unit to measure a motion variation of the observer based on the tracked location of the location tracking unit, when the location of the observer changes;
   a determination unit to compare the measured motion variation with a threshold value, and to determine whether the measured motion variation is greater than the threshold value; and
   a display unit to locally display a multi-view three-dimensional input image of the tracked location based on a tracking result of the location tracking unit,
   wherein the threshold value comprises a predetermined number of views of the multi-view three-dimensional input image.

2. The local multi-view image display apparatus of claim 1, wherein the location tracking unit identifies a head of the observer and tracks a location of the head, and the display unit displays the multi-view input image of the tracked location of the head.

3. The local multi-view image display apparatus of claim 2, wherein the display unit comprises:
   a view matching unit to match at least one view of the multi-view input image with at least one view corresponding to the tracked location of the head from among a plurality of views that are displayed by the local multi-view image display apparatus.

4. The local multi-view image display apparatus of claim 3, wherein the display unit displays the multi-view input image through the at least one view corresponding to the tracked location of the head.

5. The local multi-view image display apparatus of claim 3, wherein a number of the plurality of views that may be displayed by the local multi-view image display apparatus is greater than a number of at least one view of the multi-view input image.

6. The local multi-view image display apparatus of claim 2, further comprising:
   a transmission unit to transmit a tracking result of the changed location of the head to the display unit, when the measured motion variation is greater than the threshold value, the changed location of the head being tracked by the location tracking unit.

7. The local multi-view image display apparatus of claim 6, wherein the display unit displays the multi-view input image on the changed location of the head, when the tracking result of the changed location of the head is received from the transmission unit.

8. The local multi-view image display apparatus of claim 2, wherein the location tracking unit tracks the location of the head in real time.

9. The local multi-view image display apparatus of claim 1, wherein the location tracking unit tracks a location of a left eye and a right eye of the observer, and
   the displayed multi-view input image comprises a left image corresponding to the location of the left eye, and a right image corresponding to the location of the right eye.

10. A local multi-view image display method of a local multi-view image display apparatus, the local multi-view image display method comprising:
    tracking a location of an observer using a location tracking unit;
    measuring a motion variation of the observer based on the tracking result of the location tracking unit, when the location of the observer changes;
    comparing the measured motion variation with a threshold value, and determining whether the measured motion variation is greater than the threshold value; and
    locally displaying a multi-view three-dimensional input image on the tracked location based on a tracking result of the location tracking unit,
    wherein the threshold value comprises a predetermined number of views of the multi-view three-dimensional input image.

11. The local multi-view image display method of claim 10, wherein the tracking comprises identifying a head of the observer and tracking a location of the head, and the locally displaying comprises displaying the multi-view input image on the tracked location of the head.

12. The local multi-view image display method of claim 11, wherein the locally displaying comprises:
    matching at least one view of the multi-view input image with at least one view corresponding to the tracked location of the head from among a plurality of views that may be displayed by the local multi-view image display apparatus; and
    displaying the multi-view input image through the at least one view corresponding to the tracked location of the head.

13. The local multi-view image display method of claim 11, wherein the locally displaying comprises displaying the multi-view input image on the changed location of the head based on a tracking result of the changed location of the head, when the measured motion variation is greater than the threshold, the changed location of the head being tracked by the location tracking unit.

14. A non-transitory computer-readable recording medium storing a program for implementing a local multi-view image display method of a local multi-view image display apparatus, the local multi-view image display method comprising:
    tracking a location of an observer using a location tracking unit;
    measuring a motion variation of the observer based on the tracking result of the location tracking unit, when the location of the observer changes;
    comparing the measured motion variation with a threshold value, and determining whether the measured motion variation is greater than the threshold value; and
    locally displaying a multi-view three-dimensional input image on the tracked location based on a tracking result of the location tracking unit,
    wherein the threshold value comprises a predetermined number of views of the multi-view three-dimensional input image.

* * * * *